US 011605178B2

(12) United States Patent
Missotten et al.

(10) Patent No.: US 11,605,178 B2
(45) Date of Patent: Mar. 14, 2023

(54) WHITE CAP DETECTION DEVICE

(71) Applicant: CNH Industrial America LLC, New Holland, PA (US)

(72) Inventors: Bart M. A. Missotten, Herent (BE); Thomas Mahieu, Vleteren (BE)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 17/749,913

(22) Filed: May 20, 2022

(65) Prior Publication Data
US 2022/0375115 A1  Nov. 24, 2022

(30) Foreign Application Priority Data

May 21, 2021 (EP) .................................. 21175412

(51) Int. Cl.
*G06K 9/00* (2022.01)
*G06T 7/62* (2017.01)
(Continued)

(52) U.S. Cl.
CPC ............ *G06T 7/62* (2017.01); *A01D 41/1277* (2013.01); *G06T 7/0004* (2013.01);
(Continued)

(58) Field of Classification Search
CPC ...................... G06T 7/62; G06T 7/0004; G06T 2207/20081; G06T 2207/20084; G06T 2207/30208; A01D 41/1277
See application file for complete search history.

(56) References Cited

U.S. PATENT DOCUMENTS 5,480,354 A    1/1996  Sadjadi
8,086,378 B2 * 12/2011  Behnke .............. A01D 41/1277
                                              56/10.2 J
(Continued)

FOREIGN PATENT DOCUMENTS

CN        104062298 A     9/2014
CN        203981597 U    12/2014
(Continued)

OTHER PUBLICATIONS

Extended European Search Report for EP Application No. 21175412.2 dated Nov. 9, 2021 (six pages).
(Continued)

*Primary Examiner* — Tom Y Lu
(74) *Attorney, Agent, or Firm* — Peter Zacharias; Patrick Sheldrake

(57) ABSTRACT

A device for analyzing a grain sample including a light source, an image sensor, and a controller. The light source is configured for illuminating the grain sample. The image sensor is configured for capturing images of the grain sample. The controller is coupled to the image sensor and is configured for receiving the images of the grain sample therefrom and for analyzing the images to detect at least one material other than grain in the grain sample. The light source is configured for illuminating the grain sample with a local light spot having a size that is smaller than a width of an average wheat kernel. The image analysis and the detection of material other than grain may, at least partly, be performed using trained neural networks and other artificial intelligence algorithms.

16 Claims, 7 Drawing Sheets

(51) Int. Cl.
*G06T 7/00* (2017.01)
*A01D 41/127* (2006.01)
(52) U.S. Cl.
CPC ............... *G06T 2207/20081* (2013.01); *G06T 2207/20084* (2013.01); *G06T 2207/30208* (2013.01)

(56) References Cited

U.S. PATENT DOCUMENTS

| | | | |
|---|---|---|---|
| 8,139,824 B2 * | 3/2012 | Missotten | G01N 21/55 |
| | | | 382/209 |
| 9,629,308 B2 | 4/2017 | Schøler et al. | |
| 9,631,964 B2 | 4/2017 | Gelinske et al. | |
| 10,318,138 B2 * | 6/2019 | Schøler | A01D 41/1273 |
| 2009/0258684 A1 | 10/2009 | Missotten et al. | |
| 2016/0000008 A1 | 1/2016 | Schøler et al. | |
| 2016/0073583 A1 * | 3/2016 | Reich | G06T 7/0004 |
| | | | 702/41 |
| 2017/0235471 A1 | 8/2017 | Schøler et al. | |
| 2018/0000011 A1 * | 1/2018 | Schleusner | A01D 41/1271 |
| 2019/0073759 A1 | 3/2019 | Hader et al. | |

FOREIGN PATENT DOCUMENTS

| | | |
|---|---|---|
| CN | 108107049 A | 6/2018 |
| CN | 207850944 U | 9/2018 |
| DE | 102004063769 A1 | 7/2006 |
| EP | 1415153 | 2/2003 |
| EP | 1782046 | 2/2006 |
| EP | 1830176 A1 | 9/2007 |
| EP | 2036424 A2 | 3/2009 |
| EP | 2057882 A2 | 5/2009 |
| EP | 2131184 B1 | 7/2015 |
| EP | 3038054 A2 | 6/2016 |
| EP | 3133389 A1 | 2/2017 |
| EP | 3158849 A1 | 4/2017 |
| WO | 200312438 A3 | 2/2003 |
| WO | 2006010761 A1 | 2/2006 |

OTHER PUBLICATIONS

"NIR Grain Identification" Publication—Wasatch Photonics—dated Sep. 25, 2019 (four pages).
"Quality Assurance of Grain with Colour Line Scan Cameras" Publication—Technische Universität Ilmenau—Sensor + Test Conference 2009 OPTOIRS22009 (six pages).
Going Against the Grain: Real-Time Classification of Grain Quality Publication—Zachary Pezzementi et al (five pages).
"Determining Percentage of Broken Rice by Using Image Analysis" Conference Paper Jun. 2009—H. Aghayeghazini et al (10 pages).
"Image Analysis of Natural Products" Publication—Technische Universität Ilmenau—dated 2019 (12 pages).
"Detection of Hygiene-Relevant Parameters fro Cereal Grains Based on Intelligent Image Interpretation and Data Mining" Publication—Peter Perner and Thomas Güther—Institute of Computer Vision and Applied Computer Sciences.
"Design of Sampling Device for Rice Grain Inpurity Sensor in Grain-Bin of Combine Harvester" Publication Chen Jin et al, Jiangus University, 2019.
Transactions of the Chinese Society of Agricultural Engineering Website (http://www.tcsae.org/nygcxben/home?id=20131010100118001&name=English).

* cited by examiner

WHITE CAP DETECTION DEVICE

TECHNICAL FIELD

The present invention relates to a device for analyzing a grain sample and a combine harvester with such a device. The present invention further relates to a method for analyzing a grain sample using the device.

BACKGROUND

Combine harvesters are complex agricultural machines that drive over a field to harvest grain crops, while separating the grain ears from the plant and the grain kernels from the ears. In certain grain crop varieties, such as wheat, the grain kernels are enveloped by chaff which is separated from the kernel in a threshing, separating and cleaning unit. The separated kernels, also called clean grain, are typically gathered below the cleaning unit near a bottom of the combine harvester. From there, a grain elevator transports the clean grain up into a large grain tank that holds the harvested grain until it is unloaded into, e.g., a trailer or truck that takes the harvested grain from the field. Straw, chaff, and other non-grain material are typically dropped on or spread over the field. Non-grain material is often referred to as MOG (Material Other than Grain).

Ideally, the combine harvester would extract all the grain kernels from the crop and load them into the grain tank, without also taking in chaff, straw, and other non-grain material. In practice, an optimum must be found between maximizing the amount of harvested grain (per square meter of field and/or per minute) and minimizing the amount of broken grain kernels or MOG ending up in the grain tank. Many operational parameters of the combine harvester can be controlled to achieve this optimum. Such operational parameters, e.g., comprise drive speed, threshing rotor speed, rotor cage clearance, cleaning sieve opening, and cleaning fan speed. Many control settings that promote a large yield of grain kernels may also result in grain breakage and high amounts of MOG. Conversely, control settings that minimize grain breakage and MOG often result in a lower grain yield. The optimal control settings are difficult to determine and vary continuously with changes in, e.g., crop, weather, and field conditions.

To improve the control of all operational parameters of the combine harvester, many different sensors are used. A particularly useful sensing system used for that purpose today is a so-called grain cam, such as the one disclosed in the international patent application published as WO 2006/010761 A1, that periodically captures images of the grain in the clean grain elevator or of a grain sample that is taken from the clean grain elevator. The captured images are analyzed using standard, as well as more advanced, image recognition techniques to distinguish grain kernels, straw pieces, broken grain, and chaff. Harvester settings and travelling speed may be adapted when the MOG content of the observed grain sample exceeds a predetermined limit.

While the grain cam disclosed in WO 2006/010761 A1 is useful for determining the relative amount of MOG or broken kernels in a grain sample, it cannot distinguish all relevant types of MOG. More specifically, the known grain cam is not capable to distinguish between empty chaff particles and chaff particles still holding a grain kernel (usually called white caps). In the images captured by the grain cam, (empty) chaff particles and white caps are indistinguishable. This is a problem because excess chaff and excess white cap content in the grain sample require very different countermeasures. Excess chaff may, e.g., be avoided by increasing a fan speed of the cleaning fans. Excess white caps may, e.g., be avoided by adjusting a rotor speed of a threshing rotor and/or by reducing a gap between the threshing rotor and a rotor cage.

It is an aim of the present invention to address one or more disadvantages associated with the prior art.

SUMMARY OF THE INVENTION

According to an aspect of the invention there is provided a device for analyzing a grain sample comprising a light source, an image sensor, and a controller. The light source is configured for illuminating the grain sample. The image sensor is used for capturing images of the grain sample. The controller is coupled to the image sensor for receiving the images of the grain sample therefrom and configured to analyze the images to detect at least one material other than grain in the grain sample. The light source used in the device according to the invention is configured to illuminate the grain sample with a local light spot having a size that is smaller than a width of an average wheat kernel.

When the local light spot hits an empty chaff particle, at least a portion of the light will pass through the chaff shell and reflect at an interior surface of the empty shell. Some of this reflected light, possibly after multiple internal reflections, will pass through the chaff shell again and is then captured by the image sensor. As a result of this, the whole (or nearly the whole) chaff particle lights up in the captured image of the grain sample. When the local light spot hits a white cap, i.e., a chaff particle comprising a grain kernel, the grain kernel absorbs the light that initially passes through the chaff shell. This absorption of light by the grain kernel prevents the light from traveling any deeper into the chaff particle and reflecting at the interior surface of the chaff shell. As a consequence, only a local direct reflection of the light spot at the outer shell of the chaff particle lights up in the captured image of the grain sample. From the width of the reflection it can thus be determined whether a chaff particle contains a grain kernel. This enables the device according to the invention to distinguish empty chaff particles from white caps.

In order to allow the grain kernel to absorb a large portion of the incoming light, it is important that the size (diameter, length, and/or width) of the light spot is smaller than the width of an average grain kernel. Larger light spots will illuminate the full outer surface of the chaff shells. Direct reflection at his outer surface will then cause the whole chaff shell to appear in the captured image, making it impossible to distinguish empty chaff particles from white caps.

The projection of the light spot on the grain sample is preferably circular or substantially circular but differently shape light spots may be used as an alternative. For a circular light spot, the light spot size is defined by a diameter of the light spot. For this invention, the 'size' of any non-circular light spot is herein defined as the largest available dimension identifiable in the light spot. This largest dimension will typically be the largest of a length and a width of the light spot.

Different grain crops and grain crop varieties may have differently sized grain kernels. Preferably the light spot size is smaller than the average grain kernel of the smallest available grain crop varieties, such that the device can be used in all kinds of crop. Because the device according to the invention will primarily be used in wheat, the light spot size is preferably at least smaller than the average size of a wheat kernel. Such light spots may also be useful for detecting white caps in other grain crop types and crop type varieties, such as rye, triticale, oats, soybeans, or rice. In most wheat varieties, average kernel widths for fully developed grain are below about 5 mm. Average kernel widths are typically below about 10 mm. For the purpose of this disclosure, the terms width and length of an average wheat kernel may therefore be defined as about 5 and about 10 mm. Consequently, the local light spot has a diameter that is preferably smaller than about 5 mm, more preferably, smaller than about 3, 2, 1, or 0.5 mm.

In preferred embodiments, the light source comprises a laser source for generating the local light spot. Alternatively, a highly focused LED or other type of light source may be used.

In order to be able to detect white caps at different locations in the grain sample, the light source is preferably configured to illuminate the grain sample with a plurality of local light spots having a size that is smaller than a width of an average wheat kernel. The plurality of light spots may, e.g., be arranged along an at least substantially straight line and/or in a grid pattern.

Alternatively, or additionally, the light source may be configured to move the local light spot relative to the grain sample. This can either be achieved by controlling the location of the light spot or by moving the grain sample. For example, a single light spot or a horizontal line with multiple light spots may be aimed at a fixed location while the grain sample moves past this location. The movement of the grain sample may, at least partly, be caused by gravity or by an upward transportation of the grain in the grain elevator.

In addition to the local light spot, the light source may further be configured to illuminate the grain sample with a wide light spot having a size that is larger than multiple times a length of an average wheat kernel. The wide light spot may have a diameter of at least 5 cm. Preferably, the wide light spot illuminates the whole, or at least a large portion of, the grain sample. Images captured using this wide light spot can be processed in known ways and provide information about the location of chaff in the grain sample. This information may then be used for directing a local light spot at a location where a chaff shell was detected. With the use of the local light spot it may then be determined if the detected chaff shell represents an empty chaff particle or a white cap. Alternatively, the information obtained from images captured using the wide light spot may be used to limit the image processing regions to those regions where a chaff is particle is detected.

According to a further aspect of the invention, a combine harvester is provided comprising a device for analyzing a grain sample as described above. The combine harvester may comprise a clean grain elevator for transporting cleaned grain towards a grain tank, the device for analyzing a grain sample being arranged to capture images of grain in the clean grain elevator or in a bypass section thereof.

According to a further aspect of the invention, a method is provided for analyzing a grain sample using a device as described above. This method comprises the steps of:

using the light source to illuminate a grain sample with a local light spot having a size that is smaller than a width of an average wheat kernel, using the image sensor for capturing at least one image of the grain sample, analyze the at least one captured image to determine a reflection of the local light spot at the grain sample, and detecting, based on the determined reflection a material other than grain in the grain sample.

According to a further aspect of the invention, a computer program is provided comprising instructions which, when executed by a suitably equipped device, cause the device to carry out a method as described above.

BRIEF DESCRIPTION OF THE DRAWINGS

Embodiments of the invention will now be described by way of example with reference to the accompanying drawings.

DETAILED DESCRIPTION

Figure 1:
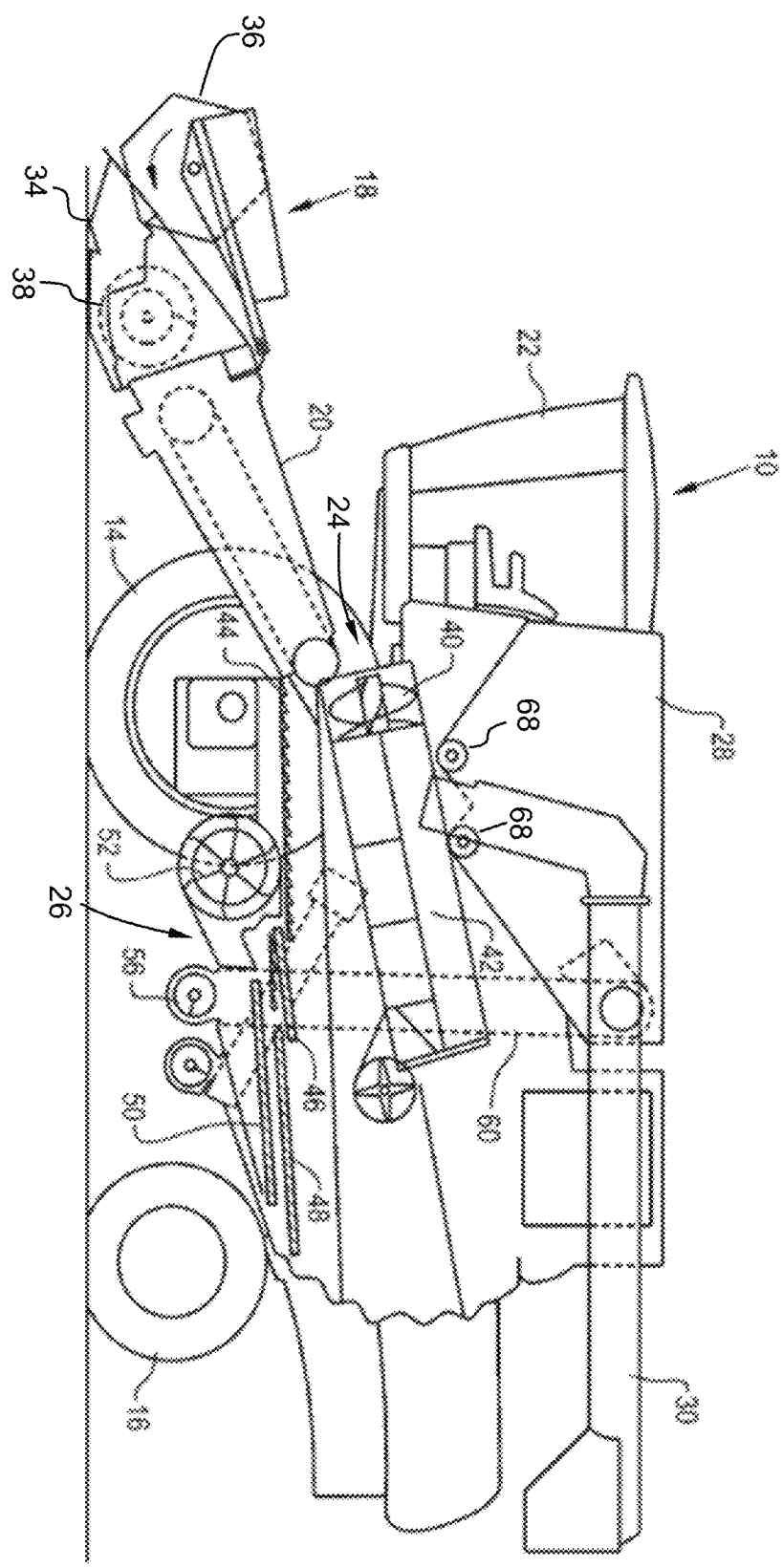
FIG. 1 shows a combine harvester wherein the grain cam according to the invention may be advantageously used.

FIG. 1 shows an agricultural harvester in the form of a combine harvester 10, which generally includes front and rear round engaging wheels 14, 16, a header 18, a feeder 20, an operator cabin 22, a threshing and separation system 24, a cleaning system 26, a grain tank 28 and an unloading tube 30. It should be appreciated that while the agricultural harvester is shown as a combine harvester 10, the agricultural harvester according to the present invention may be embodied by any construction that allows for crop material to be harvested, such as a conventional combine (which does not have a rotor), rotary combine, hybrid combine, chopper harvester, etc.

A header 18 is mounted to the front of the combine harvester 10 and includes a cutter bar 34 for severing crops from a field during forward motion of the combine. A rotatable reel 36 feeds the crop into the header 18, and a double auger 38 feeds the severed crop laterally from each side towards the feeder 20. The feeder 20 conveys the severed crop to the threshing and separating system 24.

The threshing and separating system 24 is of the axial-flow type and comprises a threshing rotor 40 at least partially located and rotatable within a threshing concave 42. The threshing concave may take the form of a perforated concave. Grain from the severed crop is threshed and separated from the MOG by the action of the threshing rotor 40 within the threshing concave 42. Larger elements of MOG, such as stalks and leaves do not pass through the perforations in the threshing concave 42 and are discharged from the rear of the combine harvester 10. Grain and smaller elements of MOG (small MOG henceforth), such as chaff, dust and straw are small enough to pass through the perforations in the threshing concave 42 and are thence discharged from the threshing and separation system 24.

Grain and small MOG that has successfully passed the threshing and separating system 24 falls onto a preparation pan 44 and is conveyed towards the cleaning system 26. The cleaning system comprises a series of sieves and a cleaning fan 52. The series of sieves includes a pre-cleaning sieve 46, an upper (or chaffer) sieve 48 and a lower (or shoe) sieve 50. The cleaning fan 52 generates an airflow through the sieves 46, 48, 50 that impinges on the grain and small MOG thereon. The small MOG is typically lighter than the grain and is therefore separated from the grain as it becomes airborne. The small MOG is subsequently discharged from the combine harvester 10 via a straw hood 54.

The preparation pan 44 and pre-cleaning sieve 46 oscillate in a fore-to-aft manner to transport the grain and small MOG to the upper surface of the upper sieve 48. The upper sieve 48 is arranged vertically above the lower sieve 50 and oscillates in a for-to-aft manner too, such that the grain and small MOG are spread across the two sieves 48, 50, while also permitting cleaned grain to pass through openings in the sieves 48, 50 under the action of gravity.

Cleaned grain falls to a clean grain auger 56 that is positioned below and in front of the lower sieve 50 and spans the width of the combine harvester 10. The clean grain auger 56 conveys the cleaned grain laterally to a vertical grain elevator 60, which is arranged to transport the cleaned grain to the grain tank 28. Once in the grain tank 28, grain tank augers 68 at the bottom of the grain tank convey the cleaned grain laterally within the grain tank 28 to an unloading tube 30 for discharge from the combine harvester 10.

Figure 2:
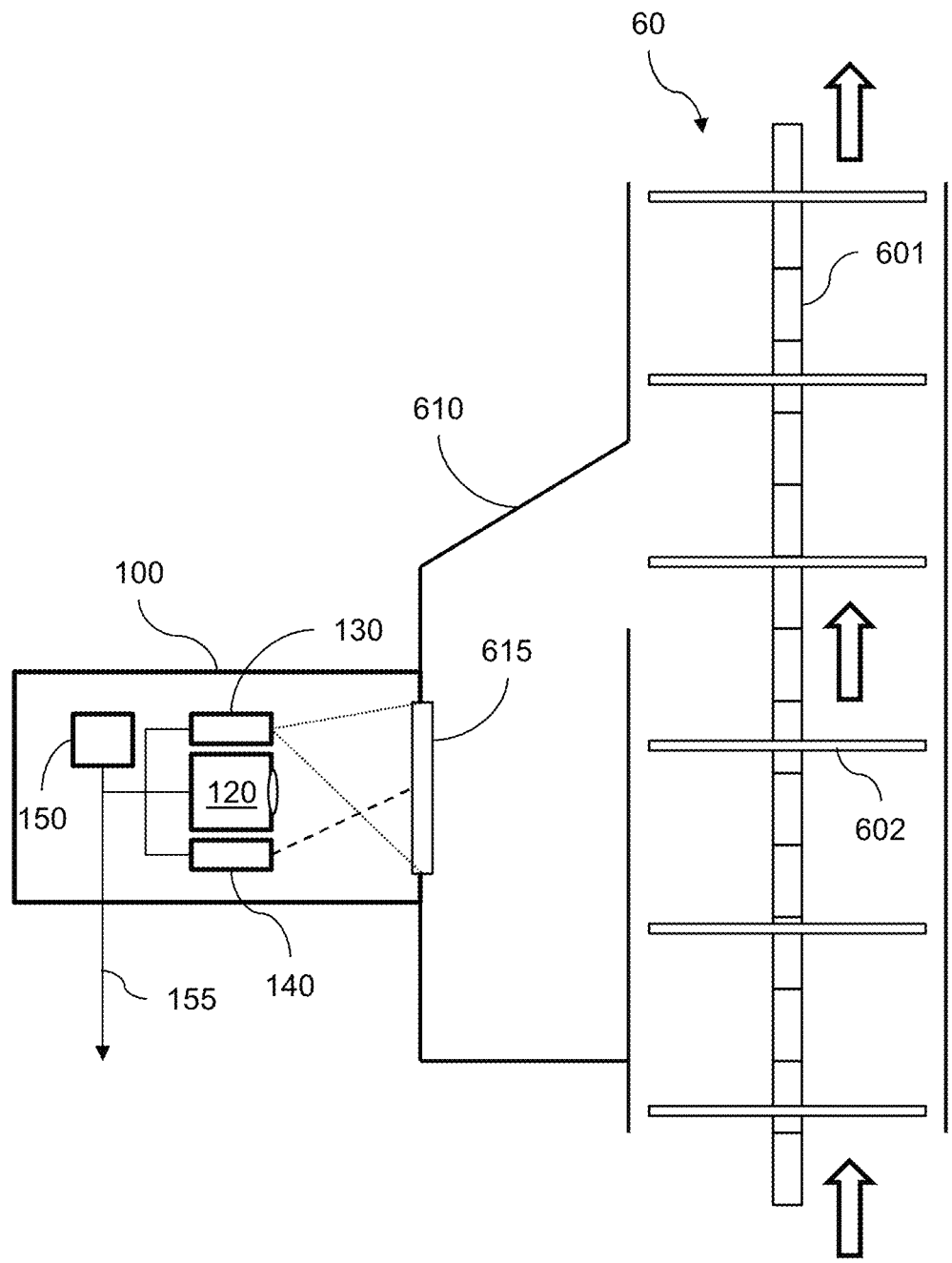
FIG. 2 schematically shows a clean grain elevator with a grain cam according to the invention.

FIG. 2 schematically shows the clean grain elevator 60 of the combine harvester 10 of FIG. 1, equipped with a grain cam 100 according to an embodiment of the invention. The grain elevator 60 comprises a chain or belt 601 with paddles 602 attached thereto. The chain or belt 601 is driven to move the paddles 602 upward at one side of the grain elevator 60 and back down at the other side. When moving upward, the paddles 602 carry cleaned grain (not shown) that is obtained from the clean grain auger 56 below the lower sieve 50. At the top of the grain elevator 60, this cleaned grain is then passed on to an auger that leads the grain into the grain tank 28, before the paddle 602 that carried the grain starts its journey back down.

In the upward section of the grain elevator 60, a bypass 710 is provided. During operation, part of the grain being transported upward by the grain elevator paddles 602 is, or can be, directed into the bypass 710. The bypass 710 comprises a window 615. When the bypass 710 is filled with grain, this grain can be viewed through the window 615, from the outside of the bypass 710. A grain cam 100 is attached to the bypass 710 in such a way that the image sensor or camera 120 of the grain cam 100 can capture images of the grain sample visible behind the window 615. In addition to the camera 120, the grain cam 100 comprises one or more light sources 130, 140 for illuminating the grain sample behind the window 615 when capturing images thereof. A controller 150 is provided for controlling the light sources 130, 140, and the camera 120, and for processing the image data obtained by the camera 120.

A communication line 155 couples the grain cam controller 150 to a central controller of the combine harvester 10 for making it possible to adjust relevant control settings of the combine harvester 10 in dependence of the results of the image analysis performed by the grain cam controller 150. Such adjustments of the combine harvester control settings may be fully automatic, user initiated, or a combination thereof. Alternatively, the grain cam control functionality and/or the image data processing functions that are embodied in the grain cam processor 150 are at least partly performed by the central controller of the combine harvester 10, or some other controller that is operationally coupled to the grain cam 100.

According to the invention, the light sources 130, 140 at least comprise a local light spot source 140 configured to illuminate the grain sample with a local light spot having a size that is smaller than a width of an average wheat kernels. The local light spot source 140 may comprise a laser. Alternatively, a highly focused LED or other type of light source may be used. In addition to the local light spot source 140, a wide light spot source 130 may be provided for illuminating the grain sample with a wide light spot having a size that is larger than multiple times a length of an average wheat kernel. The wide light spot may have a diameter of at least 5 cm. Preferably, the wide light spot illuminates the whole, or at least a large portion of, the grain sample as it can be observed through the window 615. The wide light spot source 130 may, e.g., comprise a plurality of LEDs or one or more incandescent light sources. Images captured using this wide light spot can be processed in known ways and provide information about the location of chaff in the grain sample.

It is noted that, while the grain cam 100 shown here is configured for capturing images of a grain sample in the bypass section 710 of a clean grain elevator 60 of a combine harvester 10, the grain cam 100 may be equally suitable for use in other locations where grain samples need to be analyzed. Such other location may, e.g., include different locations in the combine harvester 10, grain silos, or lab settings.

Figure 3:
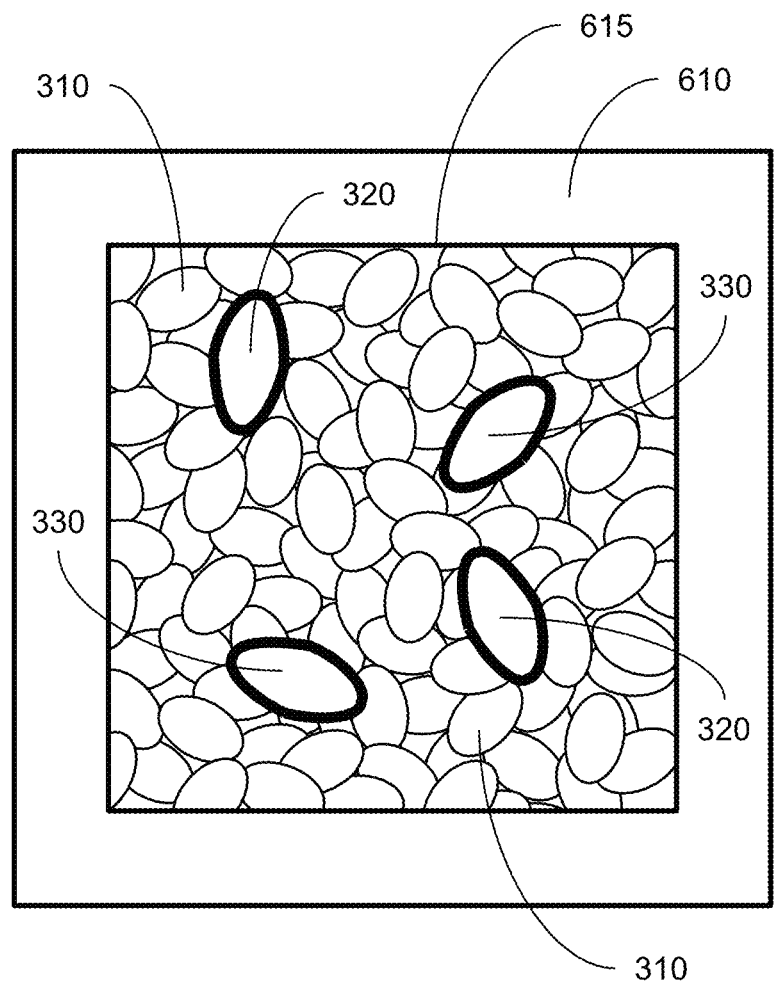
FIG. 3 shows an image captured by the grain cam of FIG. 2 with the grain sample illuminated by a wide light spot.

FIG. 3 shows an image captured by the grain cam 100 of FIG. 2 with the grain sample illuminated by the wide light spot source 130. The image captured under these lighting conditions is the same or similar to the image that can be captured by, e.g., the grain cam described in WO 2006/010761 A1. As can be seen in FIG. 3, the image shows a plurality of grain kernels 310 and four chaff shells 320, 330 that are visible through the window 615. In practice, also other types of MOG such as straw particles may show up in the image. The image shows the light reflected by the outer surfaces of the grain kernels 310 and chaff shells 320, 330 as registered by the camera 120. White caps are chaff shells that still comprise a grain kernel.

From the outside, empty chaff shells, herein also called 'chaff particles' 320, look very similar, if not exactly the same as white caps 330. This is a problem because excess chaff and excess white cap content in the grain sample require very different countermeasures. Excess chaff may, e.g., be avoided by increasing a fan speed of the cleaning fans 52. Excess white caps may, e.g., be avoided by adjusting a rotor speed of a threshing rotor 40 and/or by reducing a gap between the threshing rotor 40 and a rotor cage 42.

According to the invention, this problem is solved by adding the local light spot source 140 to the grain cam 100. When the local light spot hits an empty chaff particle 320, at least a portion of the light passes through the chaff shell and reflects at an interior surface of the empty shell 320. Some of this reflected light, possibly after multiple internal reflections, will pass through the chaff shell 320 again and is then captured by the camera 120. As a result of this, the whole (or nearly the whole) chaff particle 320 lights up in the captured image of the grain sample. When the local light spot hits a white cap 330, i.e., a chaff particle comprising a grain kernel, the grain kernel absorbs, or reflects very locally, the light that initially passes through the chaff shell. This absorption, or very local reflection, of light by the grain kernel prevents the light from traveling any deeper into the chaff particle and reflecting at the interior surface of the chaff shell. As a consequence, only a very local direct reflection of the light spot at the outer shell of the chaff particle lights up in the captured image of the grain sample.

From the width of the reflection it can thus be determined whether a chaff particle contains a grain kernel. This makes it possible for the grain cam 100 to distinguish empty chaff particles 320 from white caps 330.

Figure 4:
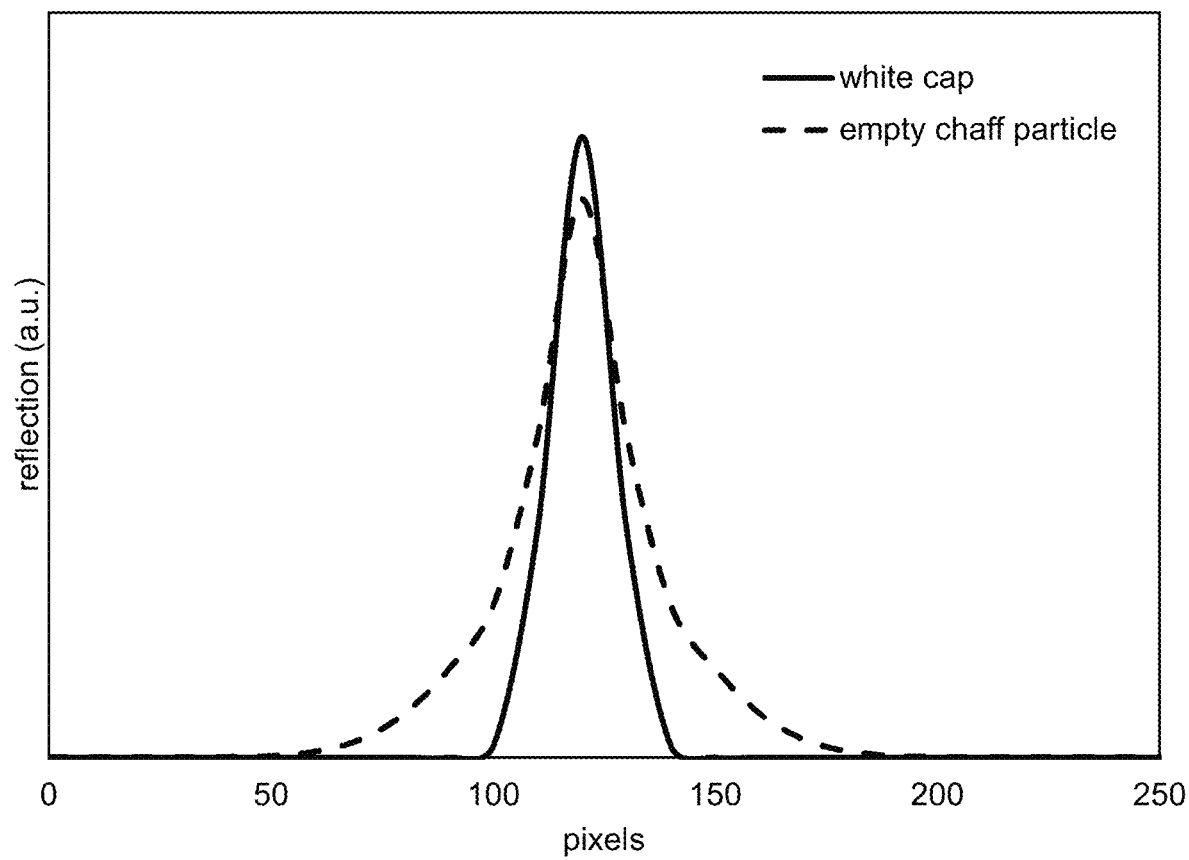
FIG. 4 shows reflection profiles for chaff particles and white caps when illuminated by a local light spot.

To illustrate this difference in reflection behavior, FIG. 4 shows reflection profiles for empty chaff particles 320 and white caps 330 when illuminated by a local light spot. As can be seen in this Figure, both empty chaff particles 320 and white caps (330) show a reflection peak (indicated in arbitrary units) caused by the direct reflection of the light spot at the outer surface of the chaff shell. If the chaff shell encloses a grain kernel, as is the case in white caps 330, most of the remaining light is absorbed by that grain kernel. If the chaff shell is empty, the chaff shell glows up over almost its full outer surface.

In order to allow the grain kernel to absorb a large portion of the incoming light, it is important that the size (diameter, length, and/or width) of the light spot is smaller than the width of an average grain kernel. Larger light spots will illuminate the full outer surface of the chaff shells. Direct reflection at his outer surface will then cause the whole chaff shell to appear in the captured image, making it impossible to distinguish empty chaff particles 320 from white caps 330. Preferably, the local light spot has a diameter that is smaller than about 5 mm, more preferably, smaller than about 3, 2, 1, or 0.5 mm.

Figure 5:
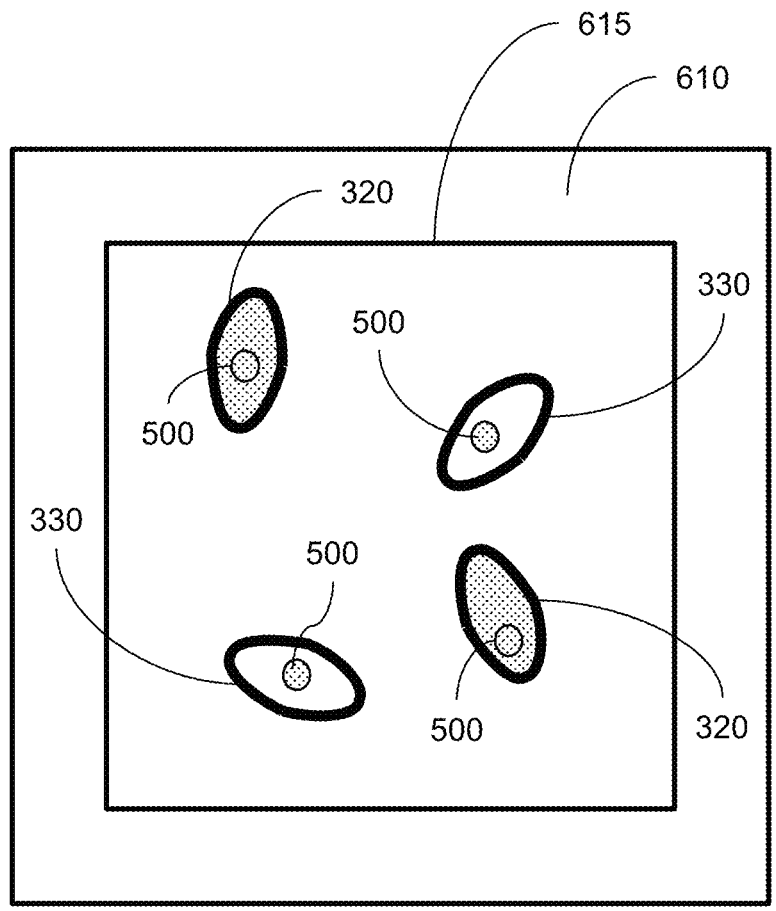
FIG. 5 shows an image captured by the grain cam of FIG. 2 with the grain sample illuminated by local light spots.

FIG. 5 shows an image captured by the grain 100 cam of FIG. 2 with the grain sample illuminated by local light spots 500. Here, it can be seen that the two empty chaff particles 320 light up over their full outer surface, while the white caps 330 only show a small direct reflection of the local light spot 500.

In order to be able to detect white caps 330 at different locations in the grain sample and to obtain images as, e.g., shown in FIG. 5, the local light spot source 140 is preferably configured to illuminate the grain sample with a plurality of local light spots. The plurality of light spots may, e.g., be arranged along an at least substantially straight line and/or in a grid pattern.

Alternatively, or additionally, the local light spot source 140 may be configured to move the local light spot relative to the grain sample. This can either be achieved by controlling the location of the light spot or by moving the grain sample. For example, a single light spot or a horizontal line with multiple light spots may be aimed at a fixed location while the grain sample moves past this location. This may, e.g., be achieved by stepwise or continuous lowering of a platform on which the grain sample is carried while the camera 120 captures a series of images of that grain sample. Alternatively, the bypass 710 has a controllable outlet positioned at a location lower than the window 615. The outlet is kept closed while the bypass 710 is filled with grain. A first image may then be captured with the outlet still closed. Subsequent images may then be captured while the grain leaves the bypass 710 via the outlet, causing the grain sample as a while to gradually move down along the bypass window 615. Other mechanical solutions to obtain a similar movement of the grain sample along the bypass window 615 will be apparent to any sufficiently skilled person. Alternatively, when the camera is mounted directly on the grain elevator 60, the grain is lifted upward by the elevator also generating a relative movement of the local light spots over the grain surface during the image capturing process.

Figure 6A:
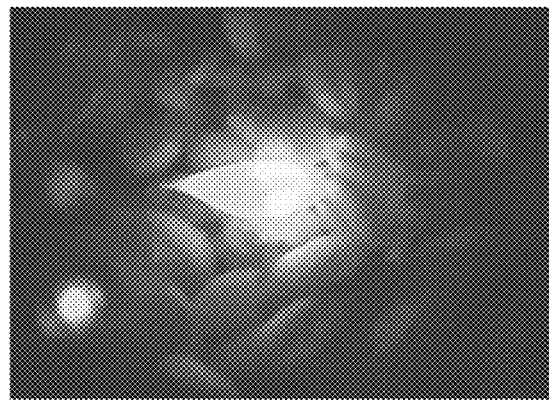
FIG. 6a shows a photo of an empty chaff particle illuminated by a local light spot.
Figure 6B:
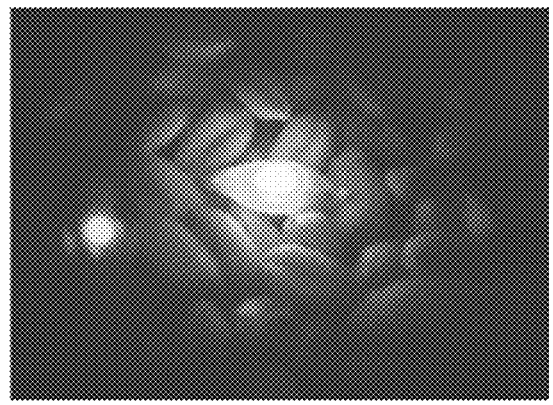
FIG. 6b shows a photo of a white cap particle illuminated by a local light spot.

FIGS. 6a and 6b respectively show a photo of an empty chaff particle and a white cap particle in a larger grain sample, illuminated by a local light spot. These two photos confirm what has already been described above with reference to the image of FIG. 5. In both photos, a direct reflection of the local light spot can be seen. In addition thereto, FIG. 6a clearly shows how the whole empty chaff particle lights up due to internal reflections of light inside the empty chaff particle. In FIG. 6b, it can be seen how most of the light is absorbed by the grain kernel inside the white cap particle, thereby significantly reducing internal reflections. As a result, the white cap particle mainly lights up in the area around where it is hit by the local light spot. As explained above, this difference in reflection pattern between the empty chaff particle in the photo of FIG. 6a and the white cap particle in the photo of FIG. 6b is used by the device and method according to the invention to detect white cap particles in grain samples.

Figure 7:
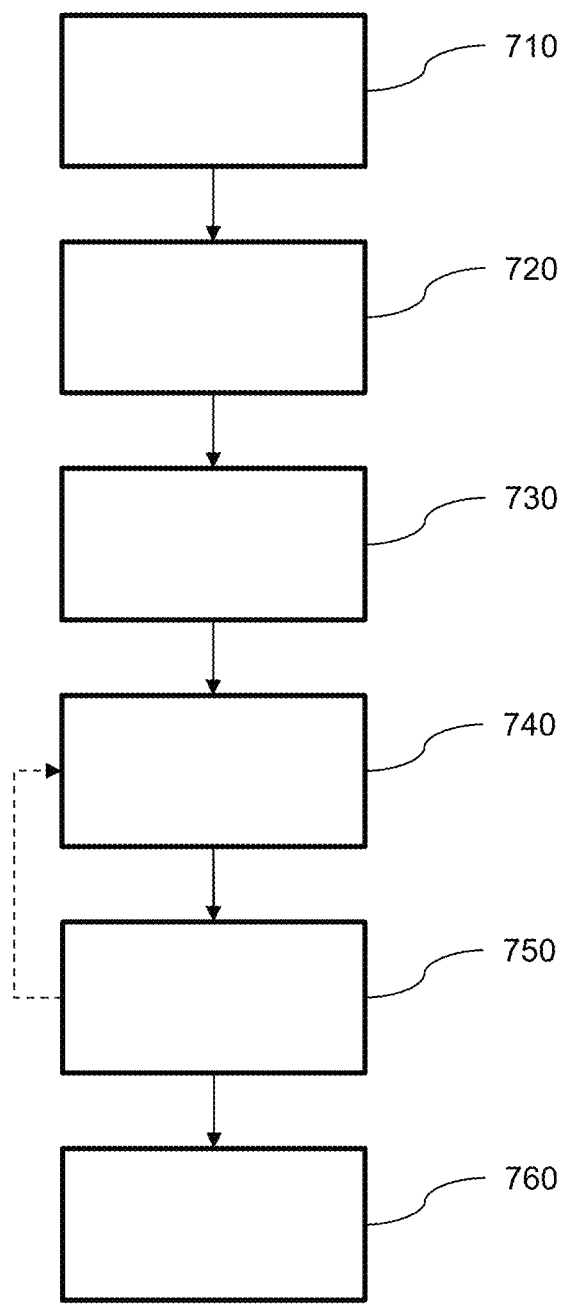
FIG. 7 shows a flow chart of an embodiment of the method according to the invention.

FIG. 7 shows a flow chart of an embodiment of the method according to the invention. The method starts with a wide illumination step 710 wherein the wide spot light source 130 is used to illuminate at least a substantial portion. Preferably, the full grain sample is illuminated (for as far as it is visible through the window 615). In a first image capturing step 720, the camera 120 then captures at least one image of the grain sample. The image obtained in this first image capturing step 720 may, e.g., look like the image shown in FIG. 3.

Using known image processing techniques, such as filtering, segmentation, edge detection, and thresholding, the captured image is then analyzed in a first image analysis step 730. In this first image analysis step 730, grain kernels 310, chaff shells 320, 330, straw particles and other types of MOG may be identified. In a preferred embodiment, trained neural networks and other artificial intelligence (AI) algorithms may be used to identify and count the different ingredients of the grain sample. Training data sets for such AI algorithms may be obtained using previously analyzed images.

In a subsequent local illumination step 740, the local light spot source 140 is used to illuminate the grain sample with a local light spot having a size that is smaller than a width of an average wheat kernel. Preferably, a plurality of local light spots is used to simultaneously illuminate the grain sample at a respective plurality of different locations. Then, in a second image capturing step 750, the camera 120 captures at least one image of the grain sample. The image obtained in this second image capturing step 750 may, e.g., look like the image shown in FIG. 5. In the event that the local light spot, or the plurality of local light spots, do not cover the full grain sample at once, the local light spot source 140 may be controlled to move the local light spot and the local illumination step 740 and the second image capturing step 750 may be repeated until a full picture of the whole grain sample is obtained.

In a second image analysis step 760, the image or images obtained in the second image capturing step 750 are analyzed to detect empty chaff particles 320 and white caps 330 in the grain sample. Also for this second image analysis step 760, both standard and more advanced image processing techniques may be used. If AI algorithms are used for this second image analysis step 760, training data sets may again be obtained using previously analyzed images. Such training data may be generated using a plurality of controlled grain samples wherein empty chaff particles 320 and/or white caps 330 are tagged before images of the grain samples are captured and analyzed. Preferably, the empty chaff particles 320 and/or white caps 330 are tagged using a technique that makes the tagging undetectable by the camera 120 of the grain cam 100. For example, radioactive or UV-reflecting dye may be used to tag the white caps 330.

In a preferred embodiment, the results of the first image analysis step 730 are used as input for the second image analysis step 720. Where the results of the first image analysis step 730 may indicate where chaff shells 320, 330 are to be found in the grain sample, the second image analysis step 760 can then be used to differentiate between empty chaff particles 320 and white caps 330. It is noted that the first two steps of the method shown in FIG. 6 are optional, and thus not essential for the detection of white caps. White caps 330 and empty chaff particles 320 can be detected with a grain cam 100 that only comprises a local light spot source 140 and no wide light spot source 130.

The invention claimed is:

1. A device for analyzing a grain sample, the device comprising
    a light source configured for illuminating the grain sample with a local light spot having a size that is smaller than a width of an average wheat kernel;
    an image sensor configured for capturing at least one image of the grain sample illuminated by the local light spot having a size that is smaller than a width of an average wheat kernel, and
    a controller coupled to the image sensor, the controller configured for:
        receiving the at least one image of the grain sample illuminated by the local light spot having a size that is smaller than a width of an average wheat kernel from the image sensor; and
        analyzing the at least one image to detect at least one material other than grain in the grain sample.

2. The device as claimed in claim 1, wherein the local light spot has a diameter that is smaller than about 5 mm.

3. The device as claimed in claim 1, wherein the light source comprises a laser source.

4. The device as claimed in claim 1, wherein the light source is further configured for illuminating the grain sample with a plurality of local light spots having a size that is smaller than a width of an average wheat kernel.

5. The device as claimed in claim 4, wherein the plurality of local light spots is arranged along an at least substantially straight line.

6. The device as claimed in claim 4, wherein the plurality of local light spots is arranged in a grid pattern.

7. The device as claimed in claim 1, wherein the light source is further configured for moving the local light spot relative to the grain sample.

8. The device as claimed in claim 1, wherein the light source is further configured for illuminating the grain sample with a wide light spot having a size that is larger than multiple times a length of an average wheat kernel.

9. The device as claimed in claim 8, wherein the wide light spot has a diameter of at least 5 cm.

10. A combine harvester comprising the device for analyzing a grain sample as claimed in claim 1.

11. The combine harvester as claimed in claim 10, further comprising a clean grain elevator for transporting cleaned grain towards a grain tank, the device for analyzing a grain sample being arranged to capture images of grain in the clean grain elevator or in a bypass section thereof.

12. A method for analyzing a grain sample using a device as claimed in claim 1, the method comprising steps of:
    using the light source to illuminate the grain sample with the local light spot,
    using the image sensor for capturing the at least one image of the grain sample,
    analyzing the at least one captured image to determine a reflection profile of the local light spot at the grain sample, and
    detecting, based on the determined reflection profile, a material other than grain in the grain sample.

13. The method as claimed in claim 12, further comprising classifying, based on the determined reflection, a type of material other than grain.

14. The method as claimed in claim 13, wherein the type of material other than grain is empty chaff particle or white cap.

15. The method as claimed in claim 14, further comprising using the light source to illuminate the grain sample with a wide light spot having a size that is larger than multiple times a length of an average wheat kernel.

16. The method as claimed in claim 15, wherein trained neural networks or other artificial intelligence algorithms are used to detect the material other than grain in the grain sample.

* * * * *